(12) United States Patent
Milojevic et al.

(10) Patent No.: US 9,592,538 B2
(45) Date of Patent: Mar. 14, 2017

(54) COMPACT AND MODULAR ROBOTIC WASH SYSTEM

(75) Inventors: Dragoslav Milojevic, Bloomfield Hills, MI (US); Kenneth A. Carmack, Howell, MI (US); Daniel A. Raetz, Rochester Hills, MI (US); Eric Gauci, Rochester Hills, MI (US); James R. Vigneau, Rochester, MI (US); Larry X. Blanchard, Madison Heights, MI (US); Paul G. Cazan, Madison Heights, MI (US); Loren J. Cazan, legal representative, Madison Heights, MI (US); Stephen J. Laski, Howell, MI (US)

(73) Assignee: ABB Inc., Cary, NC (US)

( * ) Notice: Subject to any disclaimer, the term of this patent is extended or adjusted under 35 U.S.C. 154(b) by 1265 days.

(21) Appl. No.: 13/131,805

(22) PCT Filed: Nov. 24, 2009

(86) PCT No.: PCT/US2009/065704
§ 371 (c)(1),
(2), (4) Date: Oct. 4, 2011

(87) PCT Pub. No.: WO2010/062894
PCT Pub. Date: Jun. 3, 2010

(65) Prior Publication Data
US 2012/0006363 A1 Jan. 12, 2012

Related U.S. Application Data

(60) Provisional application No. 61/118,592, filed on Nov. 29, 2008.

(51) Int. Cl.
*B08B 3/02* (2006.01)
*B08B 13/00* (2006.01)

(52) U.S. Cl.
CPC .............. *B08B 3/022* (2013.01); *B08B 3/024* (2013.01); *B08B 13/00* (2013.01)

(58) Field of Classification Search
CPC ...................................................... B08B 3/022
See application file for complete search history.

(56) References Cited

U.S. PATENT DOCUMENTS

| 4,850,382 A | 7/1989 | Williams |
| 4,993,896 A | 2/1991 | Dombrowski et al. |
| 6,215,268 B1 | 4/2001 | Choi |

(Continued)

FOREIGN PATENT DOCUMENTS

| DE | 102005055851 A1 | 5/2007 |
| DE | 102007002318 A1 | 2/2008 |

(Continued)

*Primary Examiner* — Jason Ko
(74) *Attorney, Agent, or Firm* — Taft Stettinius & Hollister LLP

(57) ABSTRACT

A compact robotic wash system is provided for cleaning a work piece. The robotic wash system includes an enclosed wash chamber. A robot is fully disposed inside the wash chamber. The robot has a maximum horizontal reach that is at least 40% of the maximum horizontal linear dimension of the wash chamber. The robot may hold a work piece and move the work piece around a plurality of spray devices. Alternately, the robot may hold one or more spray devices, while a work piece is supported on a movable table.

19 Claims, 11 Drawing Sheets

(56) References Cited

U.S. PATENT DOCUMENTS

| | | |
|---|---|---|
| 6,804,579 B1 | 10/2004 | Laski |
| 2007/0150101 A1 | 6/2007 | Laski |
| 2007/0267043 A1 | 11/2007 | Salamanca |
| 2008/0006306 A1 | 1/2008 | Leyendecker et al. |

FOREIGN PATENT DOCUMENTS

| | | |
|---|---|---|
| EP | 0110525 A1 | 6/1984 |
| EP | 0114424 A2 | 8/1984 |
| EP | 1563972 A1 | 8/2005 |
| EP | 1745858 A2 | 1/2007 |
| FR | 2526339 | 10/1983 |
| WO | 2010062894 A1 | 6/2010 |

COMPACT AND MODULAR ROBOTIC WASH SYSTEM

BACKGROUND OF THE INVENTION

A conventional robotic wash system includes a variety of components, such as a robotic device and corresponding control system, a working fluid for washing work pieces, a pump to pressurize the fluid, nozzles to spray the fluid at the objects and an end effector or frame to support the nozzles.

Conventional wash systems add solvents and heat to help break down oil or grease that may be present on the work pieces. These solvents and the increased mist and humidity from the heat can damage the components and joints of the robotic device. Moreover, heated working fluids also increase the rate at which biological contaminants grow in the robotic wash system. These biological contaminants can pose a health hazard to the people working in the plant, and can damage the robotic device and other components in the wash system. Solvents also make it difficult to recycle the working fluid. Solvents tend to mix or otherwise combine with the water and oil or grease to create emulsions. These emulsions are difficult to filter out or separate from the water without using expensive and bulky filtration system. The oil emulsions adhere to the pipe walls and clog the nozzles and other components in the system. The emulsion build up on the pipes and components creates a resilient layer that has a dampening effect on the pressurized system.

Another problem with conventional wash systems is that they take up large amounts of floor space and cannot easily be inserted into an existing manufacturing line. In this regard, the filters and separator in the recycling system of a conventional wash system require a significant amount of time to separate the contaminants and emulsions from the water in order to achieve the desired purity levels of the system. As a result, a large quantity of inactive water must remain in these filters and separators in order to support a relatively small volumetric flow through the spray nozzles. These filters and separators are also relatively large so that even a small wash cell requires a significant amount of plant floor space.

Based on the foregoing, there is a need in the art for a more compact robotic wash system that can be more easily inserted into an existing manufacturing line. The present invention is directed to such a compact robotic wash system.

SUMMARY OF THE INVENTION

In accordance with the present invention, a robotic wash system is provided for cleaning a work piece. The robotic wash system includes a wash booth having a floor, a top wall and one or more side walls. The wash booth defines an interior wash chamber having a maximum horizontal linear dimension. A pre-rinse chamber and a drying chamber are removably connected to the wash booth. A robot is fully disposed inside the wash chamber of the wash booth. The robot includes a base mounted to the floor and a gripper for grasping the work piece. The robot has a maximum horizontal reach that is at least 40% of the maximum horizontal linear dimension of the wash chamber. First and second spray devices are mounted inside the interior wash chamber and are operable to spray fluids. The first spray device is operable to spray fluid in a different direction than the second spray device. A control system is connected to the robot and is operable to control the robot to perform a cleaning method comprising operating the robot to: move the work piece from the pre-rinse chamber to the wash chamber, move the work piece relative to at least one of the first and second spray devices in the wash chamber and move the work piece to the drying chamber.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
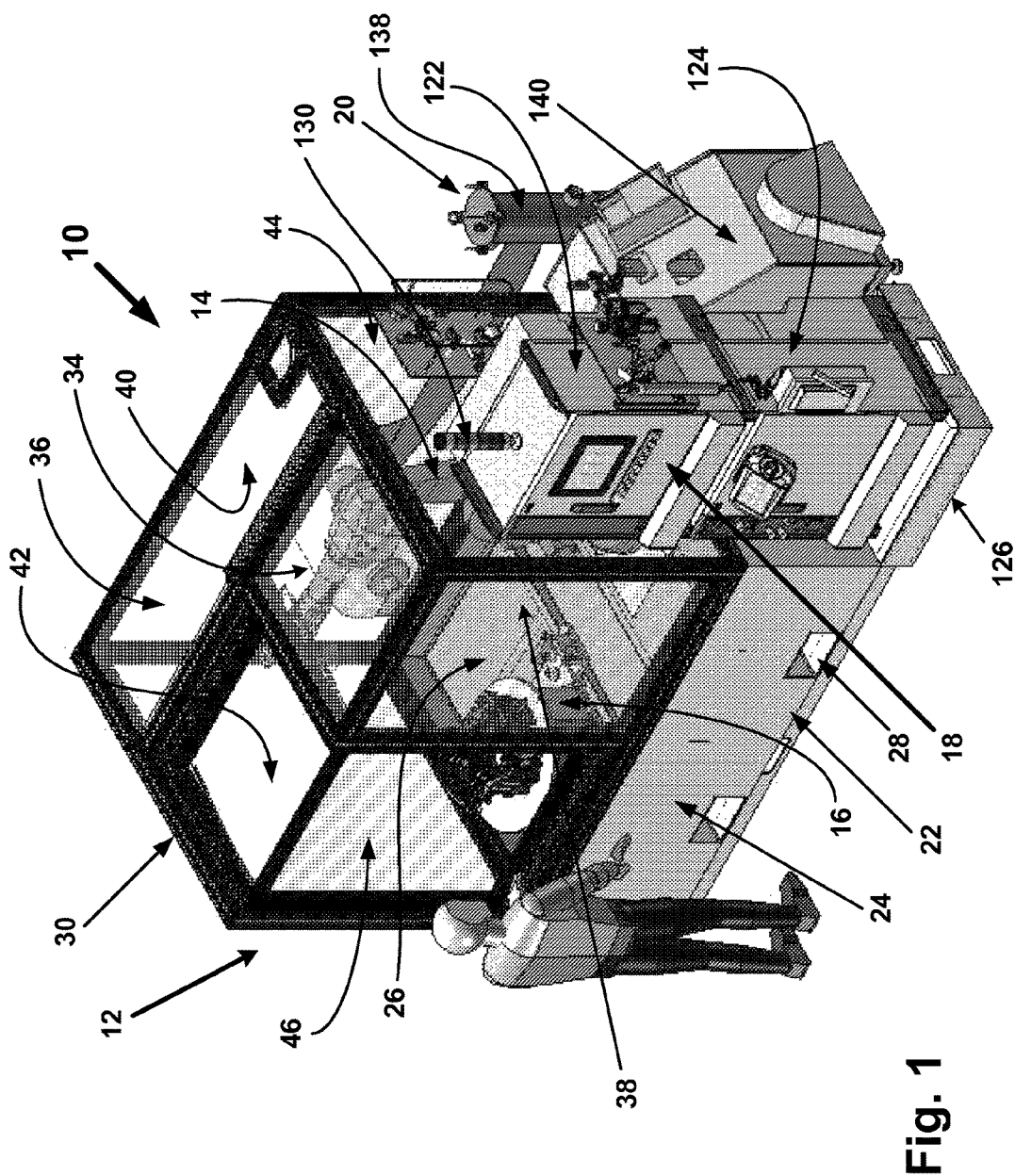
FIG. 1 is a top perspective view of a first washer unit constructed in accordance with a first embodiment of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown a first washer unit 10 constructed in accordance with a first embodiment of the present invention. The first washer unit 10 has a compact construction and a small footprint, which is well suited for applications where only limited space is available. The first washer unit 10 generally includes a booth 12, a robot 14, a holding stand 16, a control system 18 and a fluid filtration system 20. The robot 14 and the holding stand 16 are disposed inside the booth 12.

The booth 12 includes a base structure 22 having a pair of opposing side walls 24 and a pair of opposing end walls, which help support a floor 26. Each side wall 24 has a pair of fork lift pockets 28 adapted for receiving the tines of a fork lift, respectively. At least a portion of the floor 26 disposed around the holding stand 16 is grated and has a multitude of openings to permit water to flow therethrough. The side walls 24, the end walls and the floor 26 cooperate to define a lower access space that encloses a sump for receiving water passing through the floor 26.

The booth 12 further includes a rectangular top enclosure 30 that is secured to the base structure 22. The top enclosure 30 cooperates with the floor 26 to define an interior wash chamber. The top enclosure 30 includes first and second top panels 34, 36, a first side panel 38, a second side panel 40 and first and second end panels 42, 44. An access opening is formed between the first top panel 34 and the first side panel 38 on the one hand and the first end panel 42 on the other hand. The access opening is L-shaped (having a top horizontal plane and a side vertical plane) and permits objects to be moved into the interior wash chamber vertically and/or horizontally. An L-shaped door 46 is slidably mounted to rails respectively secured to the first top panel 34 and to the juncture between the first side panel 38 and the side wall 24 of the base structure 22. The door 46 is slidable between a closed position, wherein the door 46 covers the access opening, and an open position, wherein the door 46 is disposed over the first top panel 34 and the first side panel 38 and the access opening is uncovered. All or some of the first and second top panels 34, 36, first and second side panels 38, 40, first and second end panels 42, 44 and door 46 may constructed from a transparent material so as to be see-through. An example of a transparent material that may be used is acrylic gas, i.e., poly(methyl methacrylate) (PMMA) or poly(methyl 2-methylpropenoate). In one embodiment of the present invention, only the door 46 is constructed from acrylic glass, so as to be see-through, with the remaining panels of the top enclosure 30 being formed from sheet metal (such as stainless steel) so as to be non-transparent.

In one embodiment of the invention, the wash chamber in the booth 12 has a width (along the end first and second end panels 42, 44) of about five feet (1.5 meters), and a length (along the first and second side panels (38, 40) of about six feet (1.8 meters). Thus, the wash chamber has a maximum horizontal linear dimension (corner to corner) of about 7.8 feet (2.3 meters). For washing larger or smaller parts both the wash chamber and the robot 14 can have considerably larger or smaller dimensions.

Although not shown in FIG. 1, a demister unit 48 (shown in FIG. 7) is mounted to the second top panel 36 and is in air flow communication with the interior wash chamber of the booth 12 through an opening in the second top panel 36. The demister unit 48 draws air out of the interior wash chamber and replaces it with clean ambient air. The removed air is scrubbed to remove suspended water and oil. The demister unit 48 is provided with a silencer to minimize acoustic noise.

Figure 2:
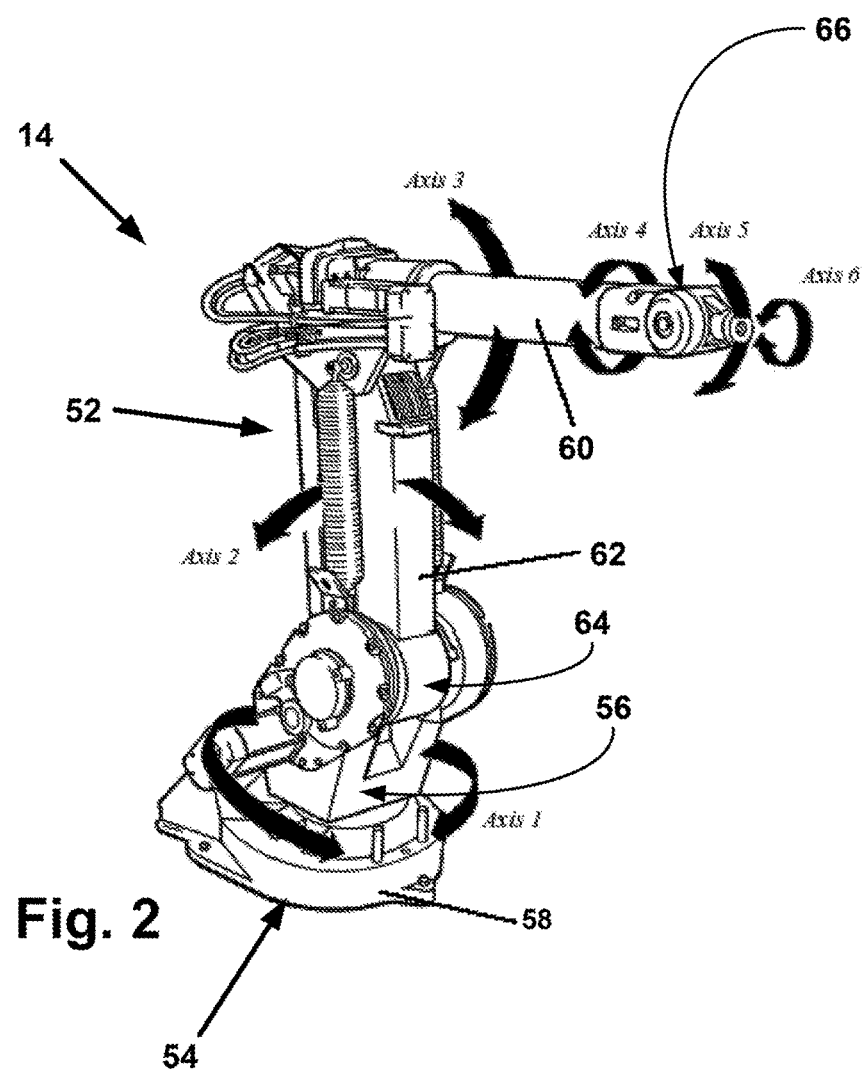
FIG. 2 is a perspective view of a robot that is mounted inside a wash chamber of the first washer unit.

Referring now to FIG. 2, there is shown a perspective view of the robot 14, which is disposed inside the booth 12, in the interior wash chamber. The robot 14 is mounted to the floor 26, proximate to the second end panel 44. The robot 14 is a six-axis robot and generally includes an articulated arm assembly 52 mounted to a pedestal 110 or base 54. The base 54 is secured to the floor 26 and includes a turret 56 rotatably connected to a mount 58 so as to be rotatable around a vertical first axis. The articulated arm assembly 52 includes upper and lower arms 60, 62. A lower end of the lower arm 60 is pivotally connected to the base 54 by a waist joint 64 so as to be pivotable about a horizontal second axis. An upper end of the lower arm 60 is pivotally connected to an inner end of the upper arm 62 by an elbow joint so as to be pivotable about a horizontal third axis. An outer end of the upper arm 62 is connected to a wrist 66 that is movable about fourth, fifth and sixth axes. The movement of the different parts of the robot 14 relative to each other is driven by a plurality of servo motors controlled by the control system 18. In one embodiment of the present invention, the robot 14 may be an IRB 1600, which is available from ABB Inc. of Auburn Hills, Mich. The IRB 1600 can carry a payload of up to 15.4 pounds (7 kg).

The robot 14 (and its work envelope) and the booth 12 are dimensioned to permit the robot 14 to operate inside the interior wash chamber of the booth 12, without requiring excess space around the robot 14. In this regard, the robot 14 has an H-Reach that is at least 40%, more particularly more than 50%, still more particularly more than 60% of the maximum horizontal linear dimension of the wash chamber in the booth 12. In the embodiment described above, where the wash chamber in the booth 12 has a maximum horizontal linear dimension of 7.8 feet (2.3 meters), the robot 14 is an IRB 1600 and has an H-Reach of about 4.75 feet (1.45 meters), which is about 61% of the maximum horizontal linear dimension of the wash chamber in the booth 12. The H-Reach (or horizontal reach) is the horizontal distance from the end of the wrist 66 to the centerline of the base 54 when the articulated arm assembly 52 is fully extended.

Figure 3:
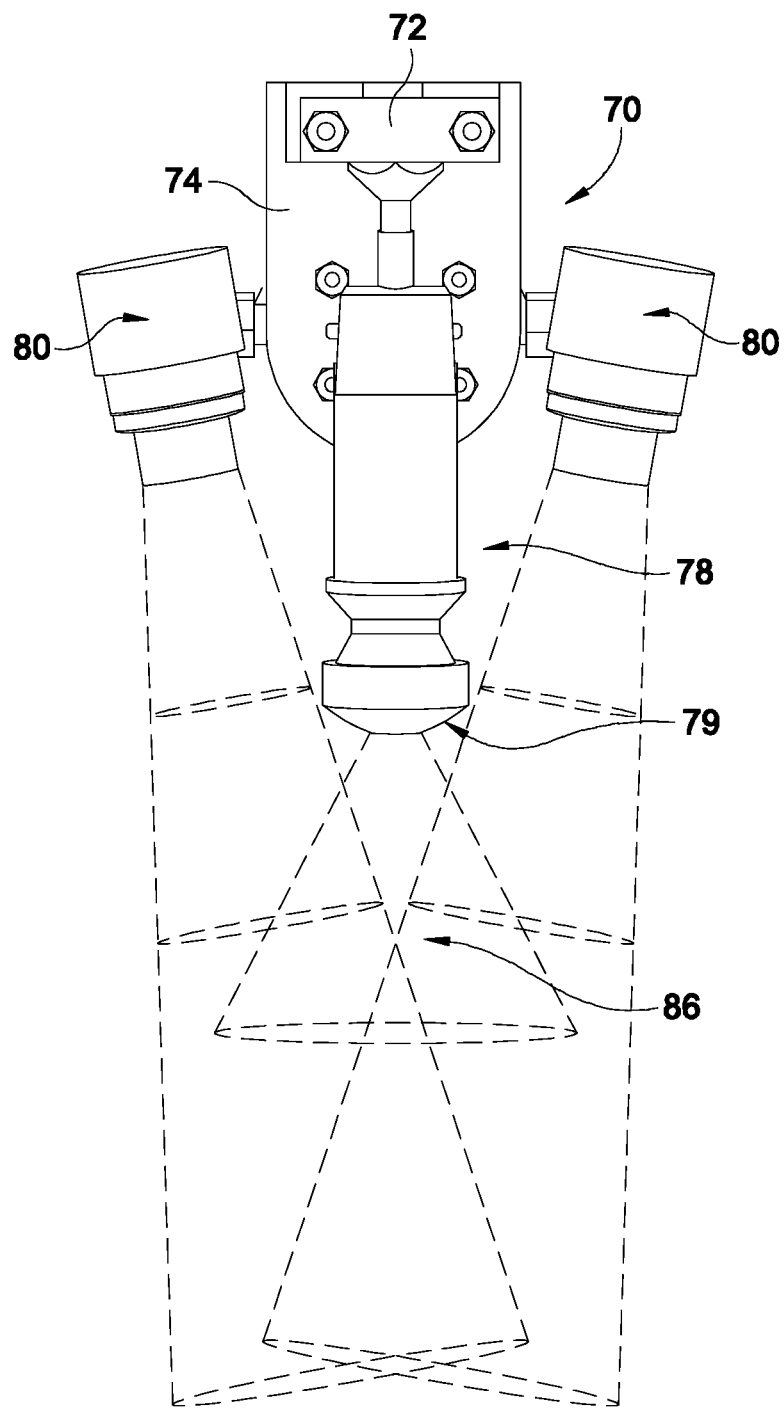
FIG. 3 is a front elevational view of a wash end effector that may be mounted to a wrist of the robot.
Figure 4:
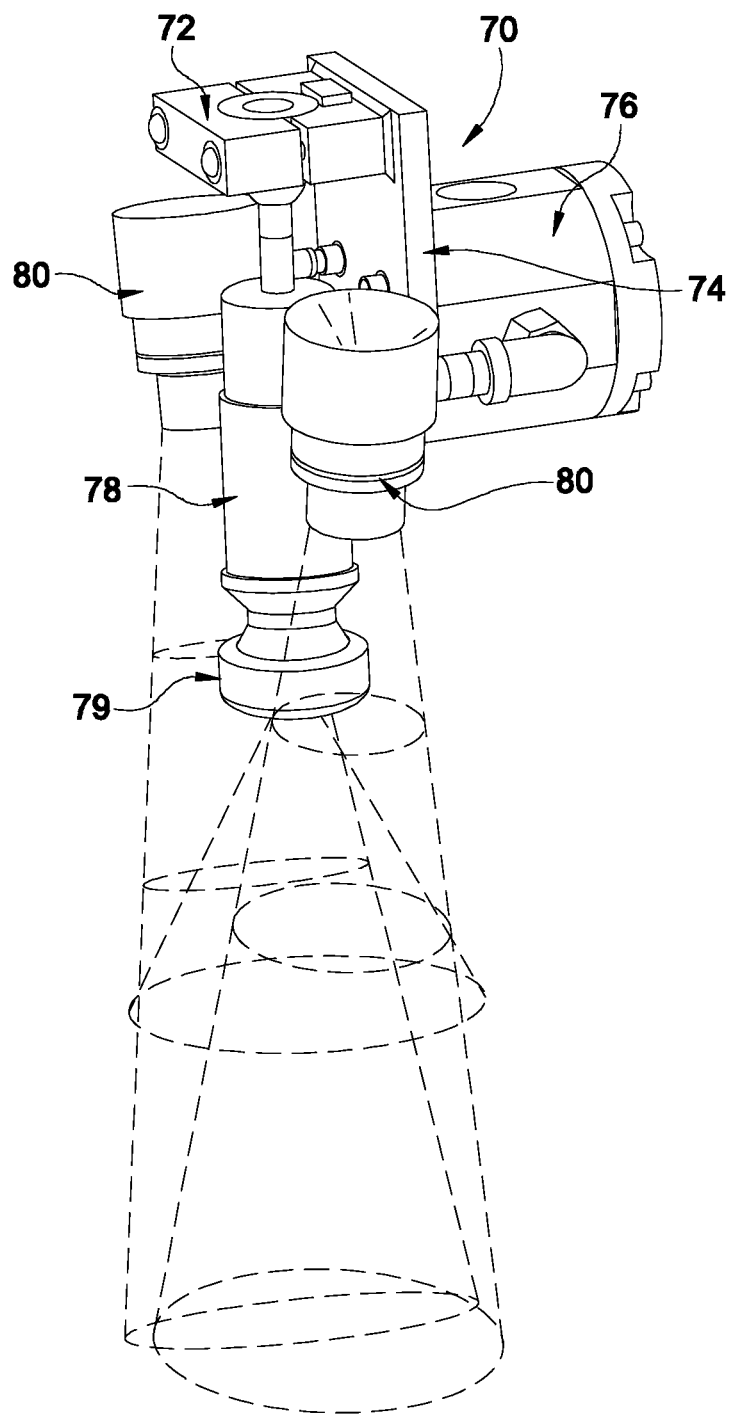
FIG. 4 is a side perspective view of the wash end effector mounted to the wrist of the robot.

Although not show in FIG. 2, an end effector is mounted to the wrist 66 of the robot 14. The end effector may be a washing end effector, a deburring end effector or an end effector that can accomplish both washing and deburring. Referring now to FIGS. 3 and 4, there is shown a washing end effector 70 that may be mounted to the wrist 66. The end effector 70 includes a first mounting bracket 72 that is secured to a second mounting bracket 74, which, in turn, is secured to a base 76. One or more water nozzles 78 are mounted to the first mounting bracket 72, while one or more air nozzles 80 are mounted to the base 76. In the embodiment shown in FIGS. 3 and 4, there is a single water nozzle 78 and two spaced-apart air nozzles 80. Each water nozzle 78 has a rotating head 79 that is operable to generate a conical spray 86 having an angle of about 27° from the centerline of the water nozzle 78. Pressurized water is supplied via a high pressure water hose to an inlet of each water nozzle 78 at a pressure in a range from about 1,000 to about 5,800 psi and at a flow rate of up to 21 gallons per minute. Air is supplied to an inlet of each air nozzle 80 at a pressure of about 60 psi via an air hose 82. Air may exit the outlet of each air nozzle 80 at a rate of about 60 cubic feet per minute (cfm) and a speed of about 85 miles per hour (mph). When cleaning oil from an aluminum surface, the inlet pressure for each water nozzle 78 may be about 3,000 psi, and the water exit rate for each water nozzle 78 may be about 3.5 gallons per minute.

Each spray 86 has an effective washing range for cleaning films, such as oil, of about one inch to about ten inches when the water is supplied at 3,000 psi. A stand-off distance of about one to two inches from the outlet orifice of the water nozzle 78 produces vigorous washing that actually heats the surface and its oil film. This is an area of ultra high-pressure or cleaning power. A stand off of about four to six inches produces hard washing that can penetrate or blast through a pool of water in a recess. This is an area of very high-pressure or cleaning power. A stand off of about eight to ten inches produces effective washing that substantially completely removes an oil film from a metal surface at a reasonable rate of speed, such as an end effector 70 speed of about two inches to about one foot per second. This is an area of effective washing power. Additives are not added to the water because presently known additives are hazardous and difficult to use in a recycling water system.

Figure 5:
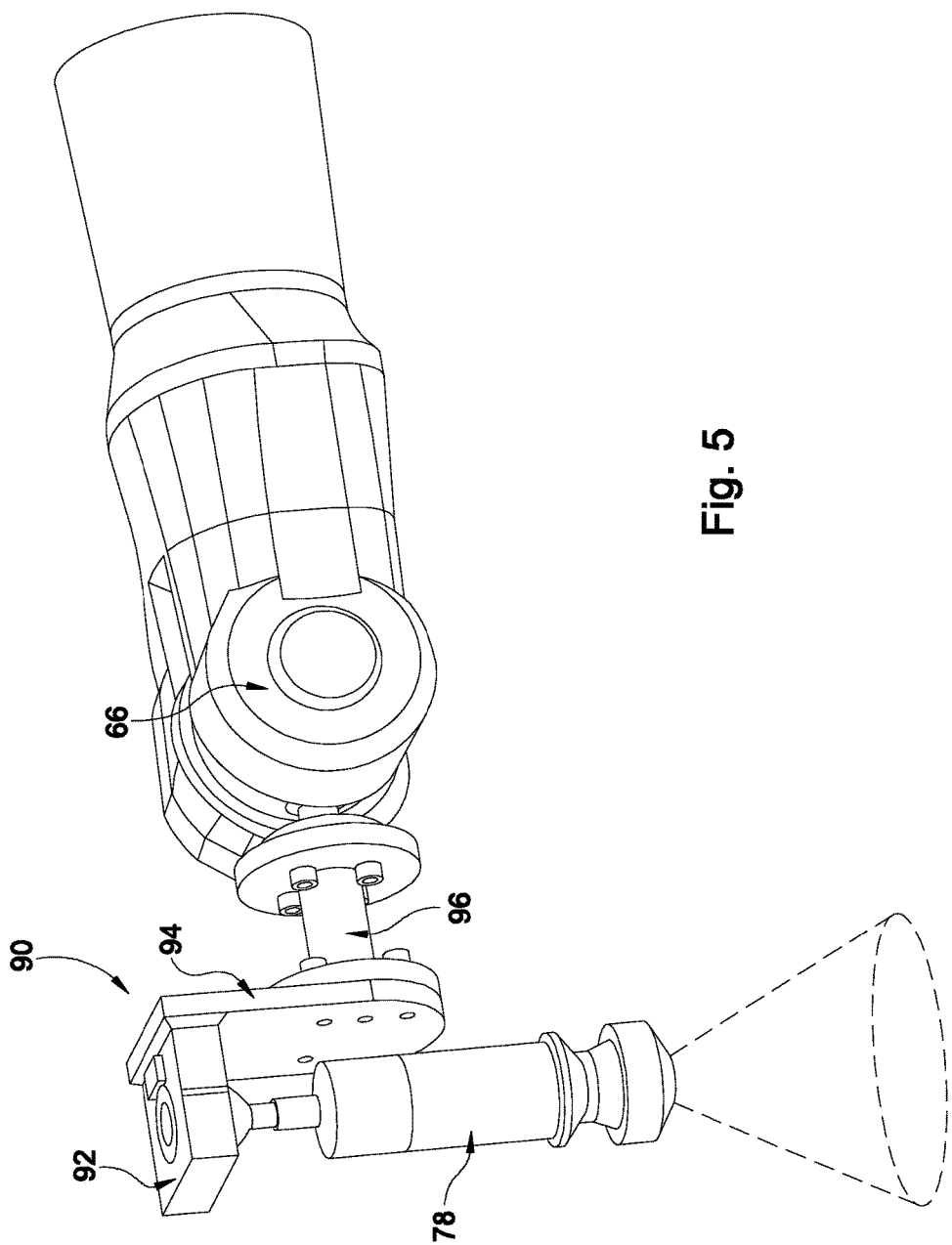
FIG. 5 is a side elevational view of a deburr end effector mounted to the wrist of the robot.

Referring now to FIG. 5, there is shown a deburr end effector 90 that may be mounted to the wrist 66 of the robot 14. The end effector 90 includes first and second mounting brackets 92, 94 connected to a base 96. The first mounting bracket 92 holds a single water nozzle 78. Water is supplied to the water nozzle 78 at a pressure of about 4,500 psi or higher.

Figure 6:
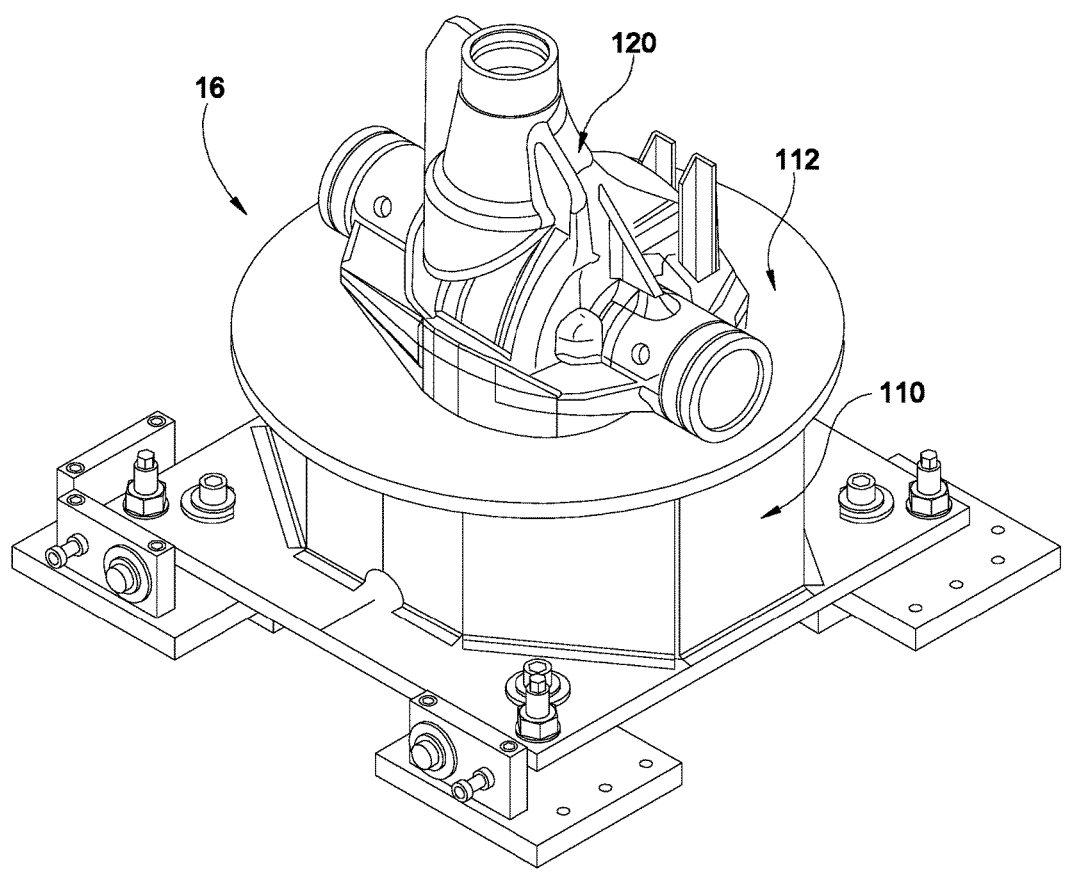
FIG. 6 is a top perspective view of a work piece supported on a stand mounted inside the wash chamber of the first washer unit.

Referring now to FIG. 1 and to FIG. 6, the holding stand 16 is disposed inside the booth 12, in the interior wash chamber. The holding stand 16 is mounted to the floor 26 so as to be readily accessible through the access opening by a loading robot, gantry or other loading device located outside the booth 12. The holding stand 16 includes a pedestal 110 to which a table 112 is rotatably mounted. The pedestal 110 may be fixed to the floor 26 or may be mounted on rails fixed to the floor 26 so as to be linearly movable along the rails in the direction between the first and second side panels 38, 40. If the holding stand 16 is fixed to the floor 26, the holding stand 16 is mounted so as to be disposed proximate to the access opening. More specifically, the holding stand 16 is aligned below the top plane of the access opening. If the holding stand 16 is movable, the holding stand 16 has a loading position located proximate to the access opening. If movable, the holding stand 16 may be moved by a conveyance system utilizing pneumatic or electrical linear actuators or motor-driven belts or chains.

The table 112 is mounted to the pedestal 110 so as to be rotatable through an angle of at least 180° relative to the pedestal 110. The table 112 may be rotated by a pneumatic or electrical actuator or an electric motor mounted inside the pedestal 110. The table 112 may be provided with holding apparatus operable to firmly hold a work piece 120 while it is being deburred and/or washed. The holding apparatus includes holding members that are fixed or movable relative to a top surface of the table 112. If the holding members are fixed, the work piece 120 may be disposed between the holding member, as shown. Alternately, rod-shaped holding members may be fixed to the table 112 and may extend through openings in a work piece. If the holding members are movable, they may be provided in two pairs, wherein in each pair at least one holding member is movable along a horizontal, linear travel path toward the other holding member so to act as a vice to engage and clamp opposing sides of a work piece 120. In such an arrangement, the travel paths of the two pairs of holding members are disposed perpendicular to each other. In addition to being horizontally movable, the holding members may be vertically movable between an extended position, wherein most of the holding members are located above the surface of the table 112, and a retracted position, wherein the holding members are located below the surface of the table 112. In this manner, the holding apparatus may be operable such that in a first phase of a washing or deburring operation, a first one of the pairs of holding members may be in the extended position and engaged with the work piece 120, while a second one of the pairs of holding members is in the retracted position. In a second phase, the table 112 may then be rotated 90° and the first one of the pairs is disengaged from the work piece 120 and moved to the retracted position, while the second one of the pairs is moved to the extended position and engaged with the work piece 120. If the holding members are movable, they may be moved vertically and/or horizontally by pneumatic or electrical linear actuators.

The control system 18 controls the operation of the robot 14 and the holding stand 16. The control system 18 is provided as an integrated unit and includes a control module 122 and a drive module 124. The control system 18 is mounted on a skid 126, which adjoins the booth 12 and may be releasably fastened thereto by bolts or other fastening devices. The control module 122 includes a housing that encloses a robot controller, an uninterruptible power supply, Local Area Network (LAN) connections (such as Ethernet, DeviceNet or Profibus), and a safety interface. An operator panel with a display screen may be mounted on the exterior of the housing. The drive module 124 includes a housing enclosing a power supply, drive units of the robot 14 and an axis computer that regulates power feed to the servo motors. A status light 130 may be mounted to the housing of the control module 122. The status light 130 provides a visual indication of the operating status of the first washer unit 10, i.e., running, not running, malfunction, etc.

The robot controller includes a central processing unit (CPU), memory and storage, such as one or more hard drives. The robot controller is connected to the robot 14, such as by a plurality of cables, including a motor power cable, a measurement signal cable and one or more communication cables. In the robot controller, the CPU is operable to execute control software stored in memory to control the operation of the robot 14. The control software is written in a robot user programming language (robot code), such as Karel, KRL or RAPID, all of which are based on the C programming language. In an embodiment of the present invention, the robot code is RAPID, which is used in robotic systems provided by ABB Inc. of Auburn Hills, Mich.

In addition to controlling the robot 14, the robot controller may also control the operation of the holding stand 16. Alternately, a separate programmable logic controller (PLC) and associated input/output modules may control the operation of the holding stand 16. The robot controller or the PLC (as the case may be) are connected by wiring to the motor(s) and actuators of the holding stand 16. The control of the robot 14 is integrated with the control of the holding stand 16 to perform methods of deburring and/or washing workpieces.

Figure 7:
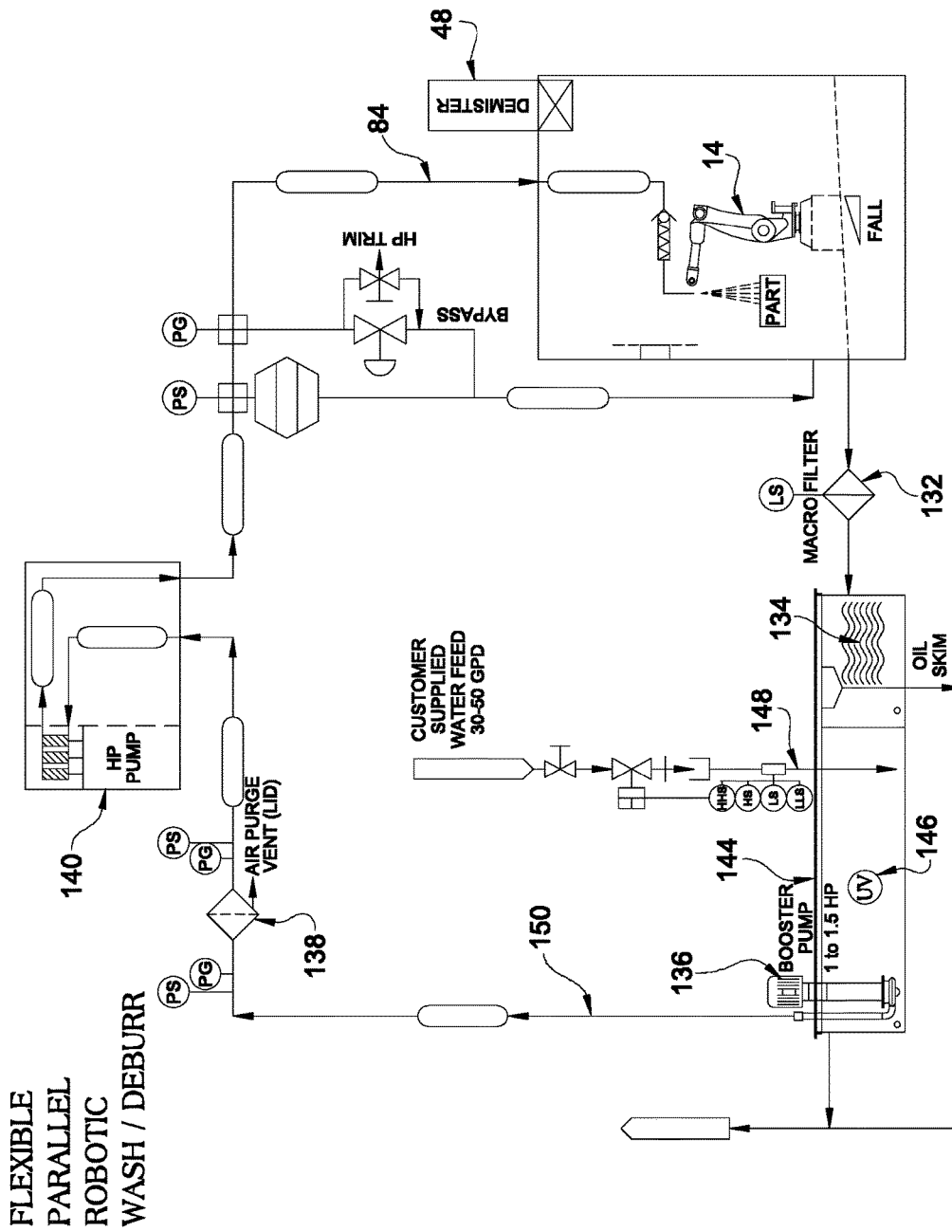
FIG. 7 is a process schematic of the first washer unit.

Referring now to FIG. 1 and to FIG. 7, the fluid filtration system 20 generally includes an interconnected macro filter 132, separator 134, booster pump 136, micro filter 138 and high pressure pump 140. The macro filter 132, the separator 134, the booster pump 136 and the micro filter 138 are mounted together as an integrated unit on a utility skid, which adjoins the booth 12 and may be releasably fastened thereto by bolts or other fastening devices. The high pressure pump 140 may also be mounted on the utility skid, or may be mounted separately, as shown.

The macro filter 132 is connected by piping to the sump in the base structure 22 so as to receive water therefrom. The macro filter 132 may simply be a screen or may be a roll media filter. A typical roll media filter has a tank divided into upper and lower compartments by a perforated plate or screen. An endless loop of a filter media is moved over the plate or screen. Through gravity alone, or together with the creation of a vacuum in the lower compartment, water is induced to flow from the upper compartment through the filter media and the plate/screen into the lower compartment. The filter media is typically driven by a drag conveyor having a pair of spaced apart chain loops connected by flights extending across the width of the filter media. The filter media may be permanent media or disposable media. The filter media may have a twill weave referred to as "1 over, 2 under", and of a coarse grade. The weave is sufficiently open to allow fine solids to freely pass through while capturing chips, which are much larger.

After passing through the macro filter 132, water flows into the separator 134, which is constructed to remove oil from water. The separator 134 may comprise a coalescing plate separator, which comprises corrugated plates of oil-attracting (oleophilic) material stacked in an array to provide a large surface area to promote the coalescing of oil droplets. The plates intercept oil droplets in the incoming water, the droplets grow in size and rise to the surface, where the oil is skimmed off the top. The separator 134 is operable to produce water containing no more than 5 (ppm) of oil. An example of a coalescing plate separator that may be used is the Plate-Pak separator available from Freytech, Inc. of Florida.

After passing through the separator 134, water flows into an adjacent tank 144 containing an ultraviolet (UV) light treatment unit 146 that kills any biological or microorganisms in the water. Makeup water may be added to the tank through a water line 148 that extends into the tank. The makeup water comprises standard city tap water having a temperature of ambient to 45° F. that has passed through a conventional reverse osmosis filter to have a particle level of less than 15 ppm of total dissolved solids. An inlet of the booster pump 136 is disposed in the tank 144. The booster pump 136, which may be a 1 to 1.5 hp electric pump, pumps the water through piping 150 to the micro filter 138.

The micro filter 138 utilizes a replaceable filter cartridge that is held in an outer housing. The cartridge may be cylindrical in shape, with water flowing radially inwardly or outwardly therethrough. The cartridge filter may be comprised of different layers of filtering material. For example, there may be one or more layers of loose filter material, such as loose carbon or metal hydroxide or metal oxide powders, and one or more layers of solid filter material, such as molded carbon blocks. The micro filter 138 is operable to filter out particles down to a size of about 20 microns. The micro filter 138 can contain two or more cartridges operating in parallel, thus enabling a continuous operation during cleaning or replacement of one of the cartridges.

After the water flows through the micro filter 138, the micro-filtered water flows to the high pressure pump 140, which is operable to pressurize the micro-filtered water to a pressure in a range from about 1,000 psi to about 15,000 psi, more particularly in a range from about 2,000 psi to about 8,000 psi. The pressurized, micro-filtered water is provided to the end effector 70, 90 mounted to the wrist 66 of the robot 14 through the water hose 84.

The cleaning of a work piece (such as the work piece 120) in the first washer unit 10 will now be described. First, the door 46 is moved to the open position and the work piece 120 is placed on the table 112 of the holding stand 16 manually, or by a loading robot, gantry or other loading device. The door 46 is then moved to the closed position. The robot 14 then performs a low intensity cleaning routine on the work piece. The air nozzles 80 are supplied with pressurized air so that the air nozzles 80 eject streams of pressurized air. Water may also be provided to each water nozzle 78 so that each water nozzle 78 ejects a spray of water. The robot 14 is controlled to move the end effector 70 over the work piece 120 to remove any loose dirt or debris using the streams of air and/or sprays of water. More specifically, the robot 14 programmably moves the end effector 70 to a start position about one to four feet above a top surface of the work piece 120, based on the predetermined coordinates of the work piece 120. The various components of the robot 14 are then moved (articulated, rotated, etc.) such that the air streams and/or water sprays are directed substantially normal to the top surface, i.e., the direction of aim of the end effector 70 is normal to the top surface. The robot 14 then moves or sweeps the end effector 70 in a series of programmed paths of travel above the top surface of the work piece 120 while maintaining the direction of aim of the end effector 70 substantially normal to the top surface, thereby dislodging and blowing away the loose dirt and debris. The paths of travel are linear or arcuate to correspond to the shape or contour of the top surface of the work piece and maintain the one to four foot clearance between the nozzles 78, 80 and the top surface. Once the programmed sweeping over the top surface is complete, the robot 14 then moves the end effector 70 to a position in front of a first side of the work piece 120 that faces the robot 14, about one to four feet from the first side surface. The various components of the robot 14 are then moved to position the end effector 70 such that its direction of aim is substantially normal to the first side surface. The robot 14 then sweeps the end effector 70 in one or more programmed paths of travel along the first side surface, while maintaining the direction of aim of the end effector 70 normal to the first side surface and the distance of the nozzles 78, 80 one to four feet from the first side surface. Once the programmed sweeping over the first side surface is complete, the table 112 is rotated so that a second side surface of the work piece 120 faces the robot 14. The robot 14 then repositions the end effector 70 and another programmed sweeping routine is performed to clean the second side surface. These sweeping processes are repeated until all of the major surfaces of the work piece 120 have been swept clean of loose dirt and debris. Between the sweepings of different side surfaces, the table 112 is rotated such that the side surface to be swept faces the robot 14.

After the work piece 120 is swept with air and/or water, the robot 14 then performs a high intensity cleaning routine to remove oil and grease from the work piece 120. During the high intensity cleaning routine, the pressurized air supply to the air nozzles 80 is turned off. Water continues to be supplied to, or begins to be supplied to, each water nozzle 78. The robot 14 then moves over the work piece 120 in the same manner as in the low intensity cleaning routine, except the end effector 70 is positioned significantly closer to the work piece 120, typically about six to eight inches. Also, depending on the size of the work piece 120, additional passes may have to be made over each of the surfaces. As in the low intensity cleaning routine, the table 112 is rotated between the cleanings of different side surfaces such that the side surface to be cleaned faces the robot 14.

After the completion of the high intensity cleaning routine, the robot 14 may perform a drying routine, wherein only pressurized air is supplied to the end effector 70 and the robot 14 moves the end effector 70 over the work piece 120 to dry the work piece 120 with streams of pressurized air emanating from the air nozzles 80.

After the completion of the high intensity cleaning and any subsequent drying routine, the door 46 is moved to the open position and the work piece 120 is moved out of the booth 12, manually, or by a loading robot, gantry or other loading device.

Figure 8:
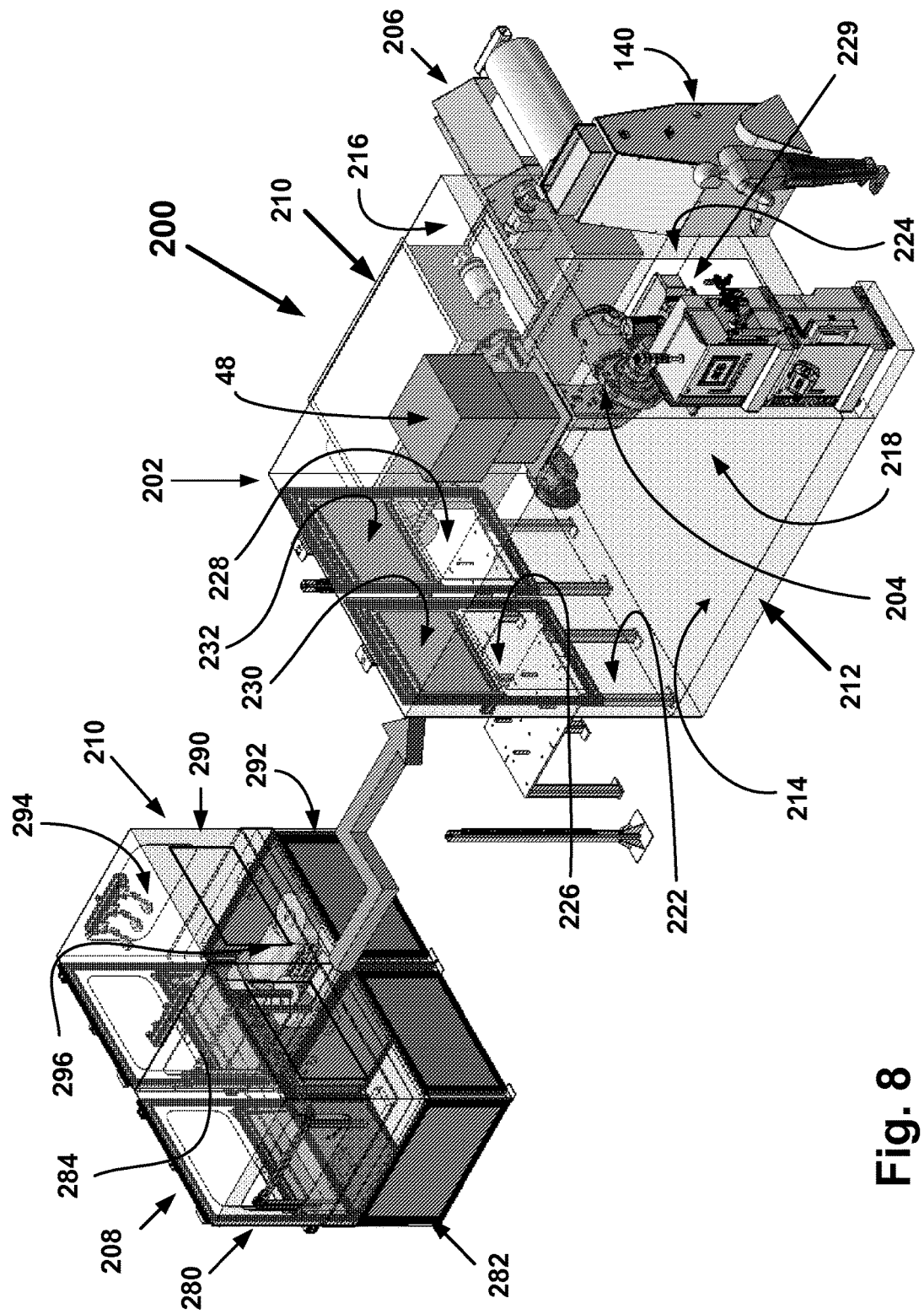
FIG. 8 is a top perspective view of a second washer unit constructed in accordance with a second embodiment of the present invention.

Referring now to FIG. 8, there is shown a second washer unit 200 constructed in accordance with a second embodiment of the present invention. The second washer unit 200 is larger than the first washer unit 10, but also has a compact construction and a relatively small footprint. The second washer unit 200 generally includes a main booth 202, a robot 204, a control system 18, a fluid filtration system 206 and optionally a pre-rinse chamber 208 and a drying chamber 210. The robot 204 is disposed inside the main booth 202.

The booth 202 includes a rectangular top enclosure 210 secured to a bottom base structure 212 that encloses an interior sump for receiving water passing through a floor 214 of the base structure 212. The enclosure 210 cooperates with the floor 214 to define an interior wash chamber. The enclosure 210 includes a top panel 216, opposing side panels 218 and first and second end panels 222, 224, each of which may be constructed from sheet metal, such as stainless steel. First and second access openings 226, 228 are formed in the first end panel 222, while a maintenance opening 229 is formed in the second end panel. First and second doors 230, 232 are mounted to the first end panel 222 and are vertically slidable to open and close the first and second access openings 226, 228, respectively. A door (not shown) closes the maintenance opening 229.

In one embodiment of the invention, the wash chamber in the booth 202 has a width (along the first and second end panels) of about nine feet, and a length (along the side panels) of about ten feet. Thus, the wash chamber has a maximum horizontal linear dimension (corner to corner) of about 13.5 feet.

A demister 48 is mounted to the top panel 216 and is in air flow communication with the interior wash chamber of the booth 202 through an opening in the top panel 216. The demister unit 48 draws air out of the interior wash chamber and replaces it with clean ambient air. The removed air is scrubbed to remove suspended water and oil. The demister unit 48 is provided with a silencer to minimize acoustic noise.

Figure 9:
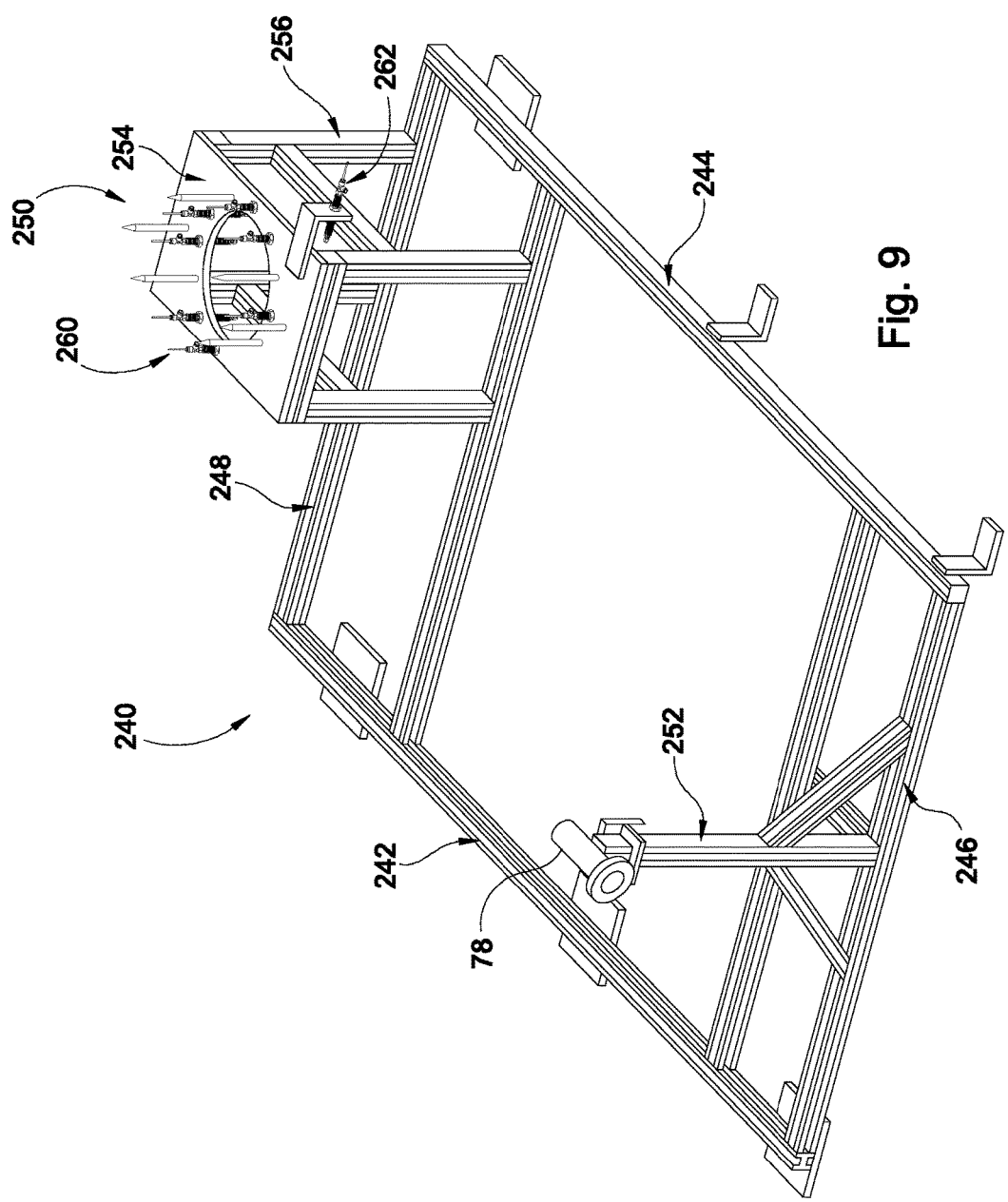
FIG. 9 is a top side perspective view of a process frame that is mounted inside a wash chamber of the second washer unit.

Referring now to FIG. 9, there is shown a process frame 240 that is mounted to the floor 214, inside the wash chamber of the booth 202. The process frame 240 is rectangular in shape and includes opposing first and second end girders 242, 244 and opposing side girders 246, 248. The process frame 240 is mounted such that the first end girder 242 is disposed toward, and parallel with, the first end panel 222, and the second end girder 244 is disposed toward, and parallel with, the first end panel 224. A stand 250 is mounted to the process frame 240, at the side girder 248, while a water jet structure 252 is mounted to the process frame 240, at the side girder 246. The stand 250 is located forward of, and to the right of, the robot 204, while the water jet structure 252 is located forward of, and to the left of, the robot 204.

Figure 10:
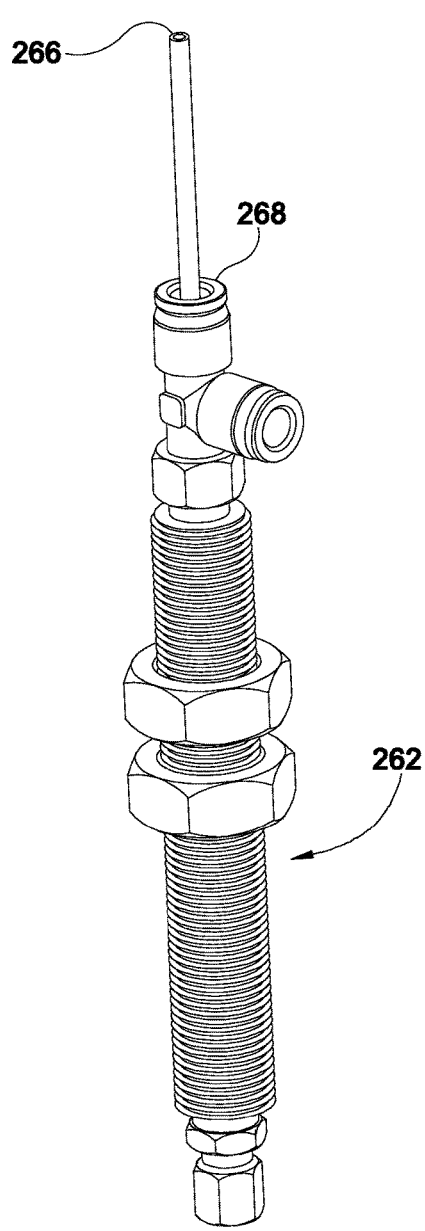
FIG. 10 is a perspective view of a deep hole evacuation device.
Figure 11:
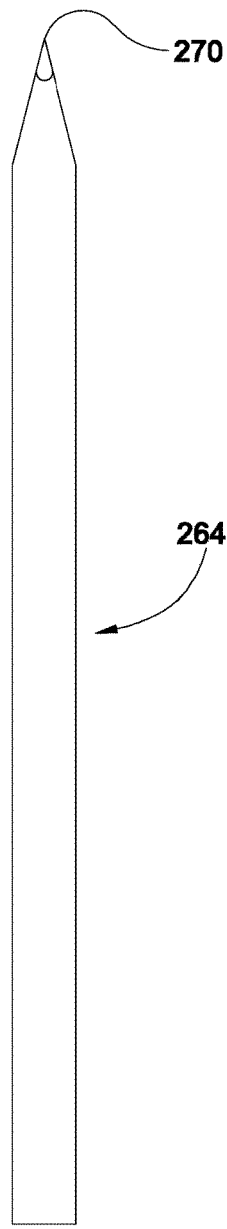
FIG. 11 is an elevational view of a lance-shaped jet nozzle for spraying water or air.

The stand 250 includes a table 254 mounted to a base 256. A conveyance system may be provided for moving the stand 250 between the first and second end girders 242, 244. The conveyance system may utilize pneumatic or electrical linear actuators or motor-driven belts or chains. Linear pneumatic or electrical linear actuators may be provided to vertically move the table 254 relative to the base 256. The table 254 has an enlarged center opening 258 through which water may fall to the floor 214. A plurality of air and/or water nozzles 260 are mounted to the table 254, around the center opening 258, and extend vertically upwardly therefrom. The nozzles 260 may include one or more deep hole evacuation devices 262 (shown in FIG. 10), one or more lance-shaped jet nozzles 264 (shown in FIG. 11) and/or one or more other types of water or air nozzles. A deep hole evacuation device 262 is mounted by a bracket to the table 254 so as to extend horizontally rearward, toward the robot 204. Each deep hole evacuation device 262 includes a tube 266 for insertion into deep holes and through which high pressure air is ejected. A concave evacuation ring 268 is disposed around a base of the tube 266. Water ejected from a deep hole by air from the tube 266 is drawn into the evacuation ring 268 to remove the water from the vicinity. Each jet nozzle 264 has a tapered head through which an outlet orifice 270 is formed. A jet nozzle 264 may eject water to clean small through-holes, or may eject air to blow water from narrow spaces.

It should also be appreciated that the nozzles 260 may be releasably connected to piping to permit each nozzle 260 to be removed and replaced with another nozzle of the same or different type. The number of piping connections may or may not be equal to the number of mounted nozzles 260, e.g. a nozzle 260 may not be connected to each piping connection, or more than one nozzle 260 may be connected to a piping connection. Each piping connection, however, has its own valve to control the flow of water/air to the nozzle(s) 260 connected to the piping connection. In this manner, water/air may be provided to the nozzles 260 on a selective basis.

It should further be appreciated that instead of being mounted to the stand 250 and extending upward therefrom, the nozzles 260 may be mounted to, and extend vertically downward from a structure mounted to the top panel 216, or may be mounted to, and extend horizontally from a structure mounted to one of the side panels 218.

The water jet structure 252 is located toward the center of the side girder 246 and includes a water nozzle 78 mounted to a vertically-extending beam 272. The water nozzle 78 extends horizontally and is directed toward the stand 250.

The robot 204 has substantially the same construction as the robot 14, except the robot 204 is larger and more powerful. The base 54 of the robot 204 is secured to the floor 214 of the base structure 212. In one embodiment of the present invention, the robot 204 may be an IRB 6600, which is available from ABB Inc. of Auburn Hills, Mich. The IRB 6600 can carry a payload of up to 496 pounds (225 kg).

The robot 204 (and its work envelope) and the wash chamber in the booth 202 are dimensioned to permit the robot 204 to operate inside the interior wash chamber of the booth 202, without requiring excess space around the robot 204. In this regard, the robot 204 has an H-Reach that is at least 40%, more particularly more than 50%, still more particularly more than 60% of the maximum horizontal linear dimension of the wash chamber in the booth 202. In the embodiment described above, where the booth 202 has a maximum horizontal linear dimension of 13.5 feet, the robot 204 is an IRB 6600 and has an H-Reach of about 8.4 feet (2550 mm), which is about 62% of the maximum horizontal linear dimension of the wash chamber in the booth 202.

Figure 12:
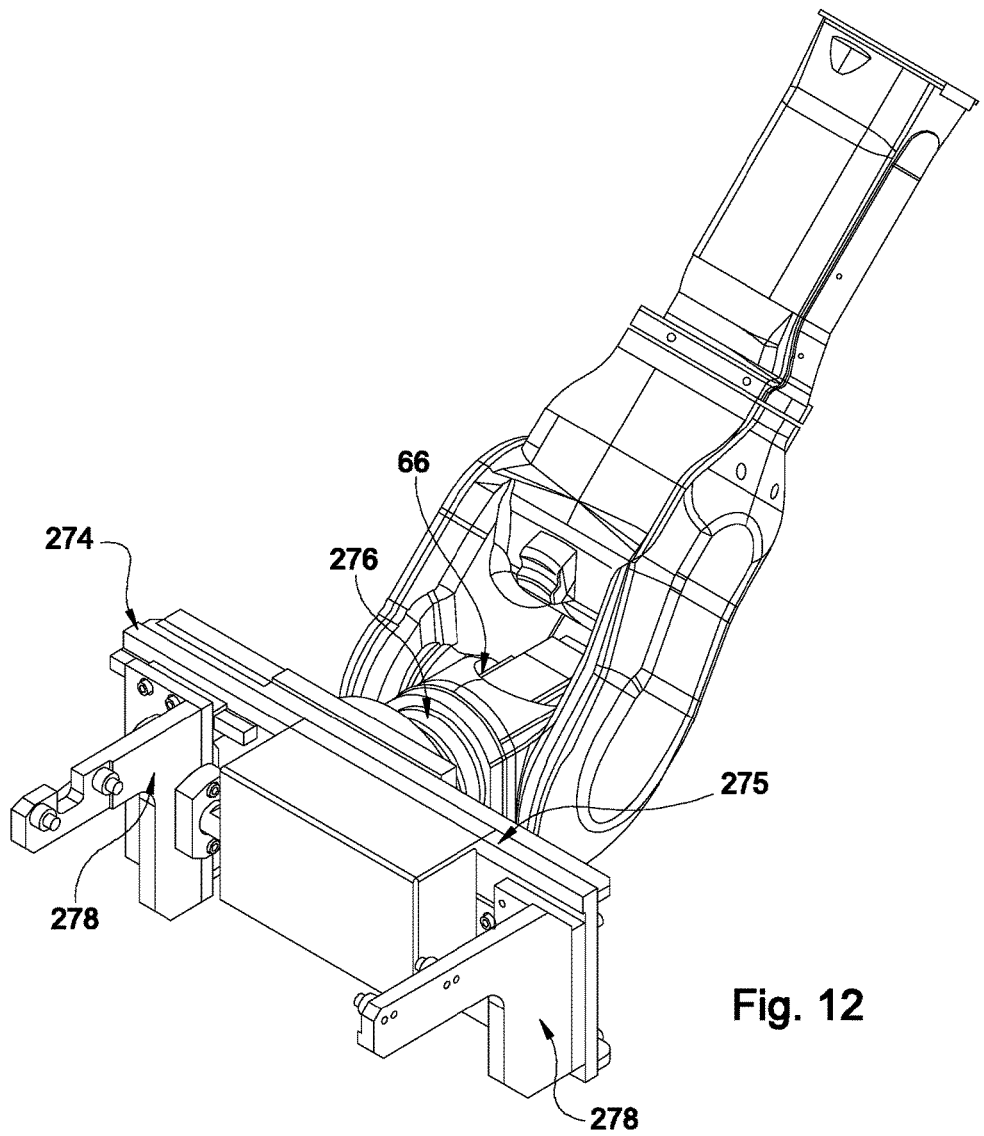
FIG. 12 is a perspective view of a holding end effector mounted to a wrist of a robot disposed inside the wash chamber of the second washer unit.

Referring now to FIG. 12, there is shown an end effector 274 that is mounted to the wrist 66 of the robot 204. Unlike the end effectors 70, 90, the end effector 274 is a gripping end effector and is operable to releasably hold a work piece to be washed/deburred. The end effector 274 includes a beam 275 secured to a mount 276. A pair of jaws 278 are mounted to the beam 275, one or both of which is/are movable to clasp a work piece between the jaws 278 in a vice-like manner. The mount 276 is attached to the wrist 66 of the robot 204.

The fluid filtration system 206 has substantially the same construction as the fluid filtration system 20 in the first embodiment, except the fluid filtration system 206 has about twice the capacity as the fluid filtration system 20. The utility skid of the fluid filtration system 206 is removably fastened to the main booth 202 by bolts or other fastening devices.

Each of the pre-rinse chamber 208 and the drying chamber 210 has a modular construction that permits the chamber to be facilely connected to, and removed from, the main booth 202 as an integral unit. The two chambers may be removably connected to the main booth 202 by bolts or other removable fasteners. Although the pre-rinse chamber 208 is shown as being located on the left and the drying chamber 210 is shown as being located on the right, the two chambers and the main booth 202 are constructed to permit either chamber to be mounted on the right or the left, depending on the requirements of the manufacturing line into which the second washer unit 200 is inserted.

The pre-rinse chamber 208 comprises an upper enclosure 280 mounted to a lower base 282. Although not shown, a stand for holding a work piece is disposed inside the pre-rinse chamber 208. The stand may have substantially the same construction as the holding stand 16 in the first embodiment. The upper enclosure 280 may have an open top (as shown) through which a work piece may be moved into the pre-rinse chamber 208. Alternately, a side wall of the upper enclosure 280 may have an entrance opening through which a work piece may be moved into the pre-rinse chamber 208. An end wall of the upper enclosure 280 has an exit opening through which a work piece is moved into the main booth 202. The exit opening is aligned with the first access opening 226 (or second access opening 228) when the pre-rinse chamber 208 is connected to the main booth 202. The pre-rinse chamber 208 may pre-rinse a work piece by immersing the work piece in water. In this embodiment, a holding portion of the pre-rinse chamber 208 is adapted to hold a volume of water sufficient to immerse the work piece while it is being held on the stand. A controllable water inlet and controllable drain permit the holding portion to be selectively filled with, and drained of, water to establish and remove the immersion volume of water. The immersing water may be made turbulent by water jets mounted around the inside of the pre-rinse chamber 208. In addition to, or in lieu of immersing the work piece, the work piece may be sprayed with lower pressure sprays of water. In this regard, a U-shaped spray pipe 284 may be mounted inside the pre-rinse chamber 208, as shown. A plurality of openings are formed in the spray pipe 284 along its travel. The openings are positioned to form sprays of water that are directed onto the work piece. The stand may be rotated to pre-rinse all sides of the work piece. The water used in the pre-rinse chamber 208 is not heated and does not include additives. Used water from the pre-rinse chamber 208 is collected in a sump located in the base 282. The sump is connected to the fluid filtration system 206 so that used water from the pre-rinse chamber 208 is passed through the fluid filtration system 206 and filtered. The water is then re-used in the pre-rinse chamber 208 or in the main booth 202.

The drying chamber 210 comprises an upper enclosure 290 mounted to a lower base 292. Although not shown, a stand for holding a work piece is disposed inside the drying chamber 210. The stand may have substantially the same construction as the holding stand 16 in the first embodiment. The upper enclosure 290 may have an open top (as shown) through which a work piece may be moved out of the drying chamber 210. Alternately, a side wall of the enclosure 290 may have an exit opening through which a work piece may be moved out of the drying chamber 210. An end wall of the upper enclosure 290 has an entrance opening through which a work piece from the main booth 202 may be moved. The entrance opening is aligned with the second access opening 228 (or the first access opening 226) when the pre-drying chamber 210 is connected to the main booth 202. First and second sets of air nozzles 294 are mounted to opposing side walls of the upper enclosure 290 and are directed toward the stand. Pressurized air is provided to the air nozzles 294 by a regenerative blower 296 mounted in the base 292. The air may be heated slightly to a temperature of about 80° F. to about 90° F. The regenerative blower 296 may have a direct drive construction, wherein an impeller is mounted directly on a shaft of an electric motor. Air provided from the air nozzles 294 passes over and swirls around the work piece held on the stand, thereby causing water on the work piece to evaporate. The stand may be rotated to ensure that air is projected onto all sides of the work piece.

The control system 18 (same as in the first embodiment) controls the operation of the robot 204, the stand 250 in the wash chamber, the stands in the pre-rinse chamber 208 and the drying chamber 210, and the operation of the valves through which water or air (as the case may be) is provided to the stand 250, the water jet structure 252, the spray pipe 284 and the air nozzles 294. The robot controller of the control system 18 is connected to the robot 204, such as by a plurality of cables, including a motor power cable, a measurement signal cable and one or more communication cables. In the robot controller, the CPU is operable to execute control software stored in memory to control the operation of the robot 204.

In addition to controlling the robot 204, the robot controller may also control the operation of the stand 250 in the wash chamber and the stands in the pre-rinse chamber 208 and the drying chamber 210, as well as the operation of the valves through which water or air (as the case may be) is provided to the stand 250, the water jet structure 252, the spray pipe 284 and the air nozzles 294. Alternately, a separate PLC and associated I/O modules may control the operation of these devices. The control of the robot 204 is integrated with the control of these devices to perform methods of deburring and/or washing work pieces.

The cleaning of a work piece (such as the work piece 120) in the second washer unit 200 will now be described. At the beginning of the cleaning process, the first and second doors 230, 232 are closed and the door closing the maintenance opening 229 is closed. The work piece 120 is placed on the table 112 of the stand inside the pre-rinse chamber 208 manually, or by a loading robot, gantry or other loading device. The work piece 120 is immersed in water and/or sprayed with water, while the table 112 is rotated.

After being pre-rinsed, the first door 230 opens and the robot 204 moves the end effector 270 into the pre-rinse chamber 208 and grasps the work piece 120 with the end effector 270. The robot 204 then moves the work piece 120 into the wash chamber of the booth 202 and the first door 230 closes. A cleaning routine is then performed on the work piece 120. Water or air (as the case may be) is supplied to a selected wash fixture, e.g., one of the nozzles 260, the deep hole evacuation device 262 mounted to the side of the table 254, or the water jet structure 252. In accordance with a programmed routine, the robot 204 places the work piece 120 into contact with the water/air sprays emanating from the selected wash fixture and moves the work piece 120 relative to the spray(s) to clean the work piece 120. More specifically, the robot 204 manipulates the work piece 120 to position each of the various surfaces of the work piece 120 at a right angle to, and at a predetermined distance from, the spray(s), while moving the work piece 120 in a series of linear or arcuate paths. Depending on the structure of the work piece 120, additional cleaning routines using different ones of the wash fixtures may be performed before or after the cleaning routine described above. For example, the water nozzle 78 of the water jet structure 252 may be used in the cleaning routine described above, and if the work piece 120 has one or more bores, a subsequent cleaning routine may be performed using one of the deep hole evacuation devices 262 mounted to the table 254, wherein the robot 204 moves and manipulates the work piece 120 such that the tube 266 of the deep hole evacuation device 262 is inserted into the bores to clean the interior thereof.

After the work piece 120 is cleaned in the wash chamber of the booth 202 as described above, the second door 232 is opened and the robot 204 moves the work piece 120 into the drying chamber 210 through the second access opening 228. The robot 204 places the work piece 120 on the table 112 of the stand inside the drying chamber 210, releases the work piece 120 and then fully withdraws back into the wash chamber. The second door 232 then closes. Heated air is supplied to the air nozzles 294 and swirls around the work piece 120, thereby drying the work piece 120. Once the work piece 120 is dry, the work piece is removed from the drying chamber 210 manually, or by a loading robot, gantry or other loading device.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A robotic wash system for cleaning a work piece, the robotic wash system comprising:
    a wash booth comprising a floor, a top wall and one or more side walls, the wash booth defining an interior wash chamber having a maximum linear dimension in a horizontal direction relative to the wash booth;
    a pre-rinse chamber removably connected to the wash booth;
    a drying chamber removably connected to the wash booth;
    a robot fully disposed inside the wash chamber of the wash booth, the robot including a base mounted to the floor and a gripper for grasping the work piece, the robot having a maximum reach in the horizontal direction that is at least 40% of the maximum linear dimension of the wash chamber in the horizontal direction;
    a process frame mounted in the interior wash chamber of the wash booth, the process frame including a stand with a table having a center opening, the stand mounted at a first side of the robot, the process frame further including a water jet structure mounted thereto at a second side of the robot opposite the first side;
    a first spray device mounted to the stand inside the interior wash chamber and a second spray device mounted to the water jet structure inside the interior wash chamber and the first and second spray devices are operable to spray fluids, the first spray device including a plurality of air and water nozzles mounted to the table around the center opening, the second spray device being oriented horizontally toward the stand; and
    a control system connected to the robot and operable to control the robot to perform a cleaning method comprising operating the robot to: move the work piece from the pre-rinse chamber to the wash chamber, move the work piece relative to the first and second spray devices in the wash chamber and move the work piece to the drying chamber.

2. The robotic wash cell of claim 1, wherein the robot has a maximum horizontal reach that is at least 50% of the maximum linear dimension of the wash chamber in the horizontal direction.

3. The robotic wash cell of claim 1, wherein the stand is movable.

4. The robotic wash cell of claim 3, wherein the table is movably mounted to a base.

5. The robotic wash cell of claim 4, wherein the first spray device extends vertically upward from the table and is operable to spray fluid upward.

6. The robotic wash cell of claim 4, further comprising a third spray device mounted to the table and extending horizontally therefrom.

7. The robotic wash cell of claim 6, wherein the third spray device is a deep hole evacuation device comprising an evacuation ring disposed around a tube through which tube pressurized air is ejected.

8. The robotic wash cell of claim 7, wherein the first spray device is a jet nozzle through which water is ejected.

9. The robotic wash cell of claim 8, wherein the water jet structure is mounted to a vertically-extending beam so as to be elevated above the floor.

10. The robotic wash cell of claim 1, wherein at least one of the fluids sprayed by the first and second spray devices comprises water and wherein at least a portion of the floor of the wash booth is grated to permit the water to flow therethrough, and wherein the robotic wash cell further comprises:
    a sump for collecting water falling through the floor, the sump being mounted below the floor;
    a filtration system operable to filter water from the sump, the filtration system comprising:
    a macro filter operable to remove large debris from the water;
    a separator operable to remove oil from the water;
    a treatment unit operable to treat the water with ultraviolet light;
    a micro filter operable to remove fine particles from the water;
    a booster pump operable to pump the water from the treatment unit to the microfilter; and
    a platform removably fastened to the wash booth; and
    wherein the macro filter, the separator, the treatment unit and the micro filter are mounted together as an integrated unit on the platform.

11. The robotic wash cell of claim 1, wherein the pre-rinse chamber comprises a rotatable stand upon which the work piece may be supported and wherein the pre-rinse chamber is adapted to hold a volume of water sufficient to immerse the work piece.

12. The robotic wash cell of claim 11, wherein the drying chamber comprises a rotatable stand upon which work piece may be supported and a plurality of air nozzle through which pressurized air may be directed onto the workpiece.

13. The robotic wash cell of claim 12, wherein the stands in the pre-rinse chamber and the drying chamber are rotatable by actuators, respectively, which are controlled by the control system.

14. The robotic wash cell of claim 1, wherein the robot has a maximum reach that is at least 60% of the maximum linear dimension of the wash chamber in the horizontal direction.

15. A robotic wash system for cleaning a work piece, the robotic wash system comprising:
    a wash booth comprising a floor, a top wall and one or more side walls, the wash booth defining an interior wash chamber having a maximum linear dimension in a horizontal direction relative to the wash booth;
    a robot fully disposed inside the wash chamber of the wash booth and mounted to the floor of the wash booth, the robot having a maximum reach in the horizontal direction that is at least 40% of the maximum linear dimension of the wash chamber in the horizontal direction;

a process frame mounted in the interior wash chamber of the wash booth, the process frame including a stand with a table for supporting the work piece, the table having a center opening, the stand mounted at a first side of the robot, the stand including a pedestal to which the table is movably mounted and an actuator for moving the table, the process frame further including a water let structure mounted thereto at a second side of the robot opposite the first side;

a first spray device mounted to the stand inside the interior wash chamber and a second spray device mounted to the water let structure inside the interior wash chamber and the first and second spray devices are operable to spray pressurized water, the first spray device including a plurality of air and water nozzles mounted to the table around the center opening, the second spray device being oriented horizontally toward the stand; and a control system connected to the robot and the stand and operable to control the robot and the stand to perform a cleaning method comprising operating the robot to move the first and second spray devices relative to the work piece and moving the table to have different surfaces of the work piece face the robot.

16. The robotic wash cell of claim 15, wherein the actuator is operable to move the table along at least one axis of translation or around at least one axis of rotation.

17. The robotic wash cell of claim 15, wherein the robot has a maximum horizontal reach that is at least 50% of the maximum horizontal linear dimension of the wash chamber in the horizontal direction.

18. The robotic wash cell of claim 15, wherein at least a portion of the floor of the wash booth is grated to permit the water to flow therethrough, and wherein the robotic wash cell further comprises:

a sump for collecting water falling through the floor, the sump being mounted below the floor;

a filtration system operable to filter water from the sump, the filtration system comprising:

a macro filter operable to remove large debris from the water;

a separator operable to remove oil from the water;

a treatment unit operable to treat the water with ultraviolet light;

a micro filter operable to remove fine particles from the water, a booster pump operable to pump the water from the treatment unit to the microfilter; and a platform removably fastened to the wash booth; and wherein the macro filter, the separator, the treatment unit and the micro filter are mounted together as an integrated unit on the platform.

19. The robotic wash cell of claim 15, wherein the robot has a maximum reach that is at least 60% of the maximum linear dimension of the wash chamber in the horizontal direction.

* * * * *